No. 641,895. Patented Jan. 23, 1900.
J. P. SCOVILL.
INTERNAL FASTENER FOR TUBULAR TELESCOPING PARTS.
(Application filed July 1, 1898.)
(No Model.)
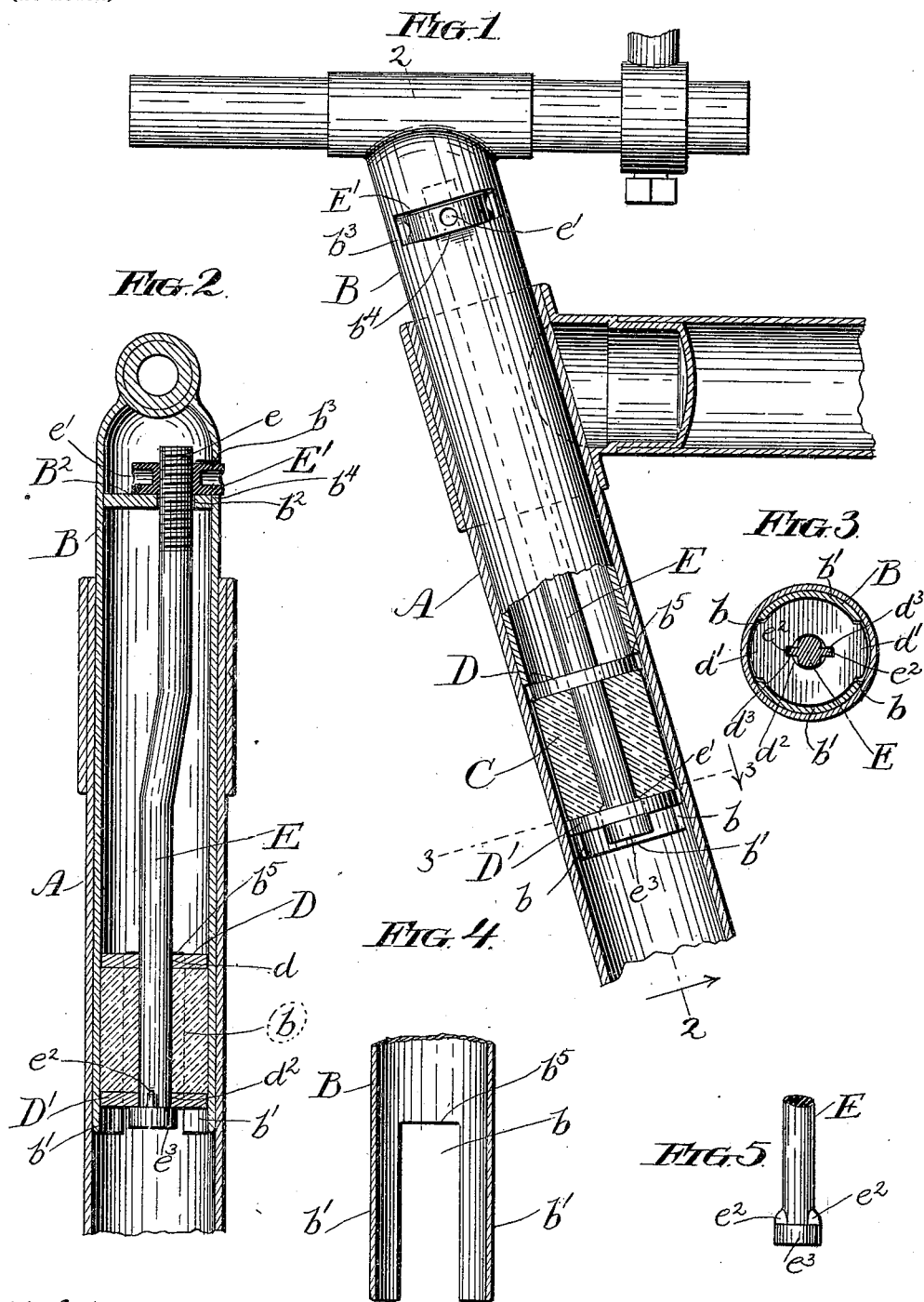
Witnesses
J. Halpenny
Geo. E. Thompson
Inventor:
James P. Scovill,
By Carter & Graves
Attys.

UNITED STATES PATENT OFFICE.

JAMES P. SCOVILL, OF CHICAGO, ILLINOIS, ASSIGNOR TO THE GEO. L. THOMPSON MANUFACTURING COMPANY, OF SAME PLACE.

INTERNAL FASTENER FOR TUBULAR TELESCOPING PARTS.

SPECIFICATION forming part of Letters Patent No. 641,895, dated January 23, 1900.

Application filed July 1, 1898. Serial No. 684,935. (No model.)

*To all whom it may concern:*

Be it known that I, JAMES P. SCOVILL, of Chicago, in the county of Cook and State of Illinois, have invented certain new and useful Improvements in Internal Fasteners for Tubular Telescoping Parts, of which the following is a specification.

This invention relates to improvements in internal fasteners for tubular telescoping parts, the particular embodiment of the invention shown being a seat or saddle post fastener for bicycles; but the invention may be otherwise embodied—as, for instance, in securing bicycle handle-bars to the steering-head or the like.

The object of the invention is to provide a device of the character referred to simple and economical in construction, convenient and positive in operation, and not likely to get out of order under severe and long-continued use.

The invention consists in the matters hereinafter described, and more particularly pointed out in the appended claims, and will be readily understood from the following description, reference being had to the accompanying drawings, in which—

Figure 1 is a view, partly in side elevation and partly in axial section, of a bicycle saddle-post equipped with my invention and secured within the seat-post standard of a bicycle-frame. Fig. 2 is an axial sectional view taken on line 2 2 of Fig. 1. Fig. 3 is a transverse sectional view taken on line 3 3 of Fig. 1 and looking downwardly. Fig. 4 is a fragmentary sectional view of a portion of the lower expansible end of the fastener. Fig. 5 is a detail view of the lower end portion of the actuating-rod.

As shown in said drawings, A designates a part of the seat-post standard of a bicycle-frame of usual construction, and B a saddle-post secured therein, said saddle-post being made tubular and arranged to telescope and fit within the upper end of the seat-post standard in the usual manner.

In carrying out my invention the lower portion of the saddle-post is expanded or forced outwardly into frictional engagement with the interior of the seat-post standard within which it telescopes, and to this end said saddle-post is bifurcated or slotted from its lower end upwardly a considerable distance at each side, as indicated at $b$, so as to permit the opposite side portions $b'$ to be forced apart. Within the bifurcated portion of the saddle-post is arranged an expanding device C, which preferably and as shown in the present instance consists of a block of vulcanized rubber adapted to be compressed endwise, so as to increase its transverse diameter sufficiently to force the parts $b'$ into forcible bearing with the seat-post standard. As a convenient construction and preferred construction said block of rubber is made of cylindric form of such diameter as to fit closely within the lower end of the saddle-post and is adapted to be compressed between a fixed diaphragm or support D, secured within the saddle-post at the upper end of the slotted or bifurcated portion thereof, and a movable diaphragm or follower D', arranged within the saddle-post in bearing with the lower end of said expanding-block. The follower D' is drawn upwardly to compress the expanding-block by means of an actuating-rod E, engaged at its lower end with the follower and arranged to extend upwardly through the expanding-block through a suitable aperture $d$, formed in the fixed diaphragm D, and projecting at its upper end through a bearing or guide aperture $b^2$, formed in a second fixed diaphragm or transverse support $B^2$, secured in the upper part of the saddle-post.

In order to draw the actuating-rod and connected follower upwardly, said rod is provided at its upper end with a screw-threaded portion $e$, which engages a nut E', resting upon and having bearing contact with the support $B^2$, and in order to afford access to the nut, so that the latter may be rotated, a transverse slot $b^3$ is formed through the side of the saddle-post at a point opposite the nut and of sufficient length to permit the nut to be turned a suitable part of a revolution by means of a suitable spanner inserted through the slot and engaging spanner-holes $e'$, formed in the periphery of the nut. Preferably, and as shown in the present instance, the nut E' will be made circular and of sufficient diameter to project slightly at its periphery through the slot $b^3$, as indicated clearly in the drawings, this construction having the advantage of permitting the nut to be turned a greater part of a revolution at each step and also allowing it to rest upon the part of the wall of the saddle-post $b^4$ forming the lower side of the slot $b^3$, thereby relieving the support $D^2$ of a part of the working strain due to the nut resting thereon.

As a convenient means of supporting the fixed diaphragm D and at the same time preventing it from rotation, the latter is constructed in the form of a disk provided at diametrically opposite points upon its periphery with ears or lugs $d'$, which extend within the slots $b$ of the saddle-post, the upper surfaces of said ears engaging the upper end walls $b^5$ of said slots and preventing upward movement of the diaphragm under the thrust of the expanding-block and the sides of said lugs preventing rotation of the diaphragm or support by engagement with the side walls of the slots.

The follower $D'$ is desirably made a counterpart of the part D, with the exception that the central aperture $d^2$ thereof is provided at diametrically opposite points with radially-extending notches $d^3$, with which are engaged a pair of wings or splines $e^2$, formed upon the actuating-rod E, so as to prevent the latter from rotating with the nut $E'$.

As a desirable means of connecting the follower $D'$ with the actuating-rod so as to cause it to move positively with the latter, said rod is headed or upset at its lower end, as indicated at $e^3$, the upsetting or heading of the actuating-rod and formation of the splines being conveniently accomplished by the use of suitable dies.

The parts constructed as described may be assembled by first placing the follower $D'$, the expanding-block, and the fixed compressing-block D upon the upper end of the actuating-rod in order named and slipping them down until the follower engages the splines, as described. The parts thus assembled may now be inserted within the saddle-post and into register with the aperture $b^2$ of the support $B^2$, whereupon the actuating-rod may be passed through said support and engaged with the nut.

While I have herein shown a preferred embodiment of my invention, yet it will be obvious that the details thereof may be varied without departing from the spirit of the invention, and it will be further obvious that the fastener may be employed for other purposes than that herein described.

I claim as my invention—

1. An internal fastener for telescoping tubular parts comprising a tubular inner member having yieldable wall portions capable of being expanded outwardly, an expanding device located within the part of the tubular member having the expansible wall portions, comprising a body of yieldable material capable of being compressed in a direction longitudinally of the member to increase its transverse measurement, whereby the yieldable parts of the tubular member may be forced into engagement with the outer telescoping member, and means for compressing said yieldable body comprising confining-blocks arranged at opposite ends of the body and means for effecting the forcible approach of said blocks.

2. An internal fastener for telescoping tubular parts comprising an outer member, an inner tubular member slotted longitudinally so as to permit a portion of its side wall to be expanded outwardly, compressing-blocks arranged within said slotted portion, provided with projections engaging the slots to prevent rotation, a body of compressible material interposed between the compressing-blocks, and means for forcing one of the blocks toward the other, comprising an actuating-rod operatively engaged with one of said blocks and extending longitudinally through the inner tubular member to a point beyond the telescoped portion thereof, and means enabling said rod to be operated from the outside.

3. An internal fastener for telescoping tubular parts comprising an outer member, an inner tubular member slotted longitudinally so as to permit a portion of its side wall to be expanded outwardly, compressing-blocks arranged within said slotted portion, provided with projections engaging the slots to prevent rotation, a body of yieldable rubber interposed between the compressing-blocks, means for forcing one of the blocks toward the other comprising an actuating-rod positively engaged with one of said blocks and extending thence loosely through the rubber block and the second compressing-block to a point within the exposed portion of the inner tubular member, and means enabling said rod to be moved endwise to compress the rubber block comprising a nut with which said rod has screw-threaded engagements rotatably mounted but held from endwise movement within the exposed portion of the inner member and an opening in said inner member opposite the nut and through which the latter may be operated.

In testimony that I claim the foregoing as my invention I affix my signature hereto, in the presence of two subscribing witnesses, this 24th day of June, A. D. 1898.

JAMES P. SCOVILL.

Witnesses:
GEO. L. THOMPSON,
ALBERT H. GRAVES.